United States Patent [19]

Ono et al.

[11] Patent Number: 4,873,164
[45] Date of Patent: Oct. 10, 1989

[54] ELECTROPHOTOGRAPHIC PHOTORECEPTOR COMPRISING A CHARGE TRANSPORT MEDIUM AND A BIS-AZO COMPOUND CONTAINING OXYGEN

[75] Inventors: Hitoshi Ono, Yokohama; Yoshiaki Kato, Mitaka, both of Japan

[73] Assignee: Mitsubishi Kasei Corporation, Tokyo, Japan

[21] Appl. No.: 192,456

[22] Filed: May 11, 1988

[30] Foreign Application Priority Data

May 14, 1987 [JP] Japan .................. 62-117933
Jan. 12, 1988 [JP] Japan .................. 63-4564

[51] Int. Cl.$^4$ ............................. G03G 5/06
[52] U.S. Cl. ............................ 430/58; 430/78
[58] Field of Search .................. 430/78, 58

[56] References Cited

U.S. PATENT DOCUMENTS

| | | | |
|---|---|---|---|
| 2,569,418 | 9/1951 | Kellog | 534/691 |
| 3,898,084 | 5/1975 | Champ | 430/72 |
| 4,251,613 | 2/1981 | Sasaki | 430/72 |
| 4,294,755 | 10/1981 | Kanter | 260/154 |
| 4,377,518 | 3/1983 | von der Bruck | 260/156 |
| 4,396,696 | 8/1983 | Nagasaka et al. | 430/78 |
| 4,507,471 | 3/1985 | Ohta | 534/755 |
| 4,618,555 | 10/1986 | Suzuki et al. | 430/78 |

FOREIGN PATENT DOCUMENTS 0078575 5/1983 European Pat. Off. .
2623839A1 5/1976 Fed. Rep. of Germany .
3037911A1 5/1982 Fed. Rep. of Germany .
3216738 11/1982 Fed. Rep. of Germany .

Primary Examiner—J. David Welsh
Attorney, Agent, or Firm—David G. Conlin; Patricia A. McDaniel

[57] ABSTRACT

An electrophotographic photoreceptor according to the present invention has a photosensitive layer comprising a bis-azo compound represented by the general formula (I):

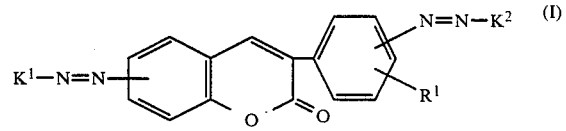

wherein
$K^1$ and $K^2$ are independently a coupling ingredient residue with a hydroxy group which has a coupling activity;
$R^1$ is a hydrogen atom, a lower alkyl group, a lower alkoxy group or a halogen atom.

14 Claims, 5 Drawing Sheets

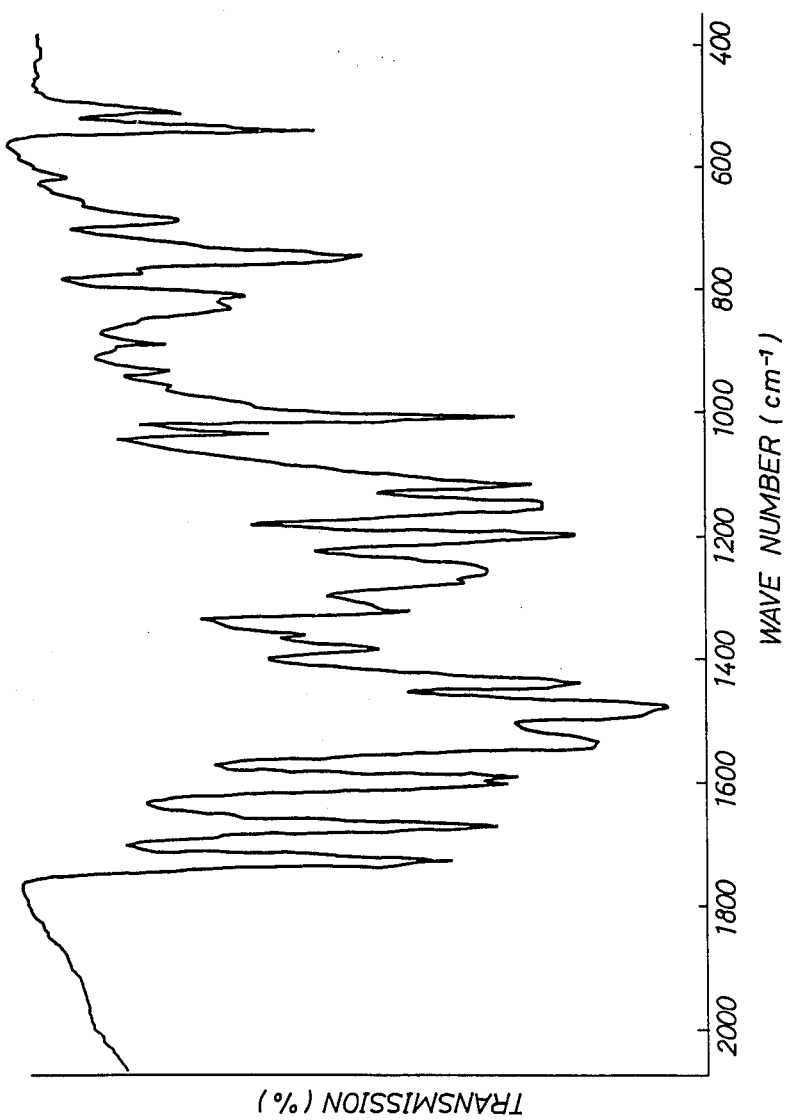

ELECTROPHOTOGRAPHIC PHOTORECEPTOR COMPRISING A CHARGE TRANSPORT MEDIUM AND A BIS-AZO COMPOUND CONTAINING OXYGEN

This invention relates to an electrophotographic photoreceptor. More particularly, it relates to a highly sensitive electrophotographic photoreceptor comprising a novel bis-azo compound.

Hitherto, inorganic photoconductive substances such as selenium, cadmium sulfide, zinc oxide and the like have been generally used in a photosensitive layer of the electrophotographic photoreceptor. Alternatively, in these days, organic photoconductive substances (referred to hereinafter as "OPC") are increasingly put to use in the electrophotographic photoreceptor (referred to hereinafter as "OPC receptor") for use in a printer and usual copying machine, because the OPC receptor has such advantages over that which uses the inorganic photoconductive substances in its photosensitive layer as follows:

(1) it is non-polluting;
(2) it may be easily prepared and handled;
(3) it may be easily shaped into various forms such as a dram, sheet and belt;
(4) it may produce fine and clear images.

However, the OPC receptor is inferior in sensitivity and durability to the photoreceptor using the inorganic substances and is therefore used for the present mainly in a low-speed machine.

DESCRIPTION OF DRAWINGS

FIGS. 2–5 are spectras in the infrared of disazo products made in Examples 1, 2, 33 and 48 respectively.

Figure 1:
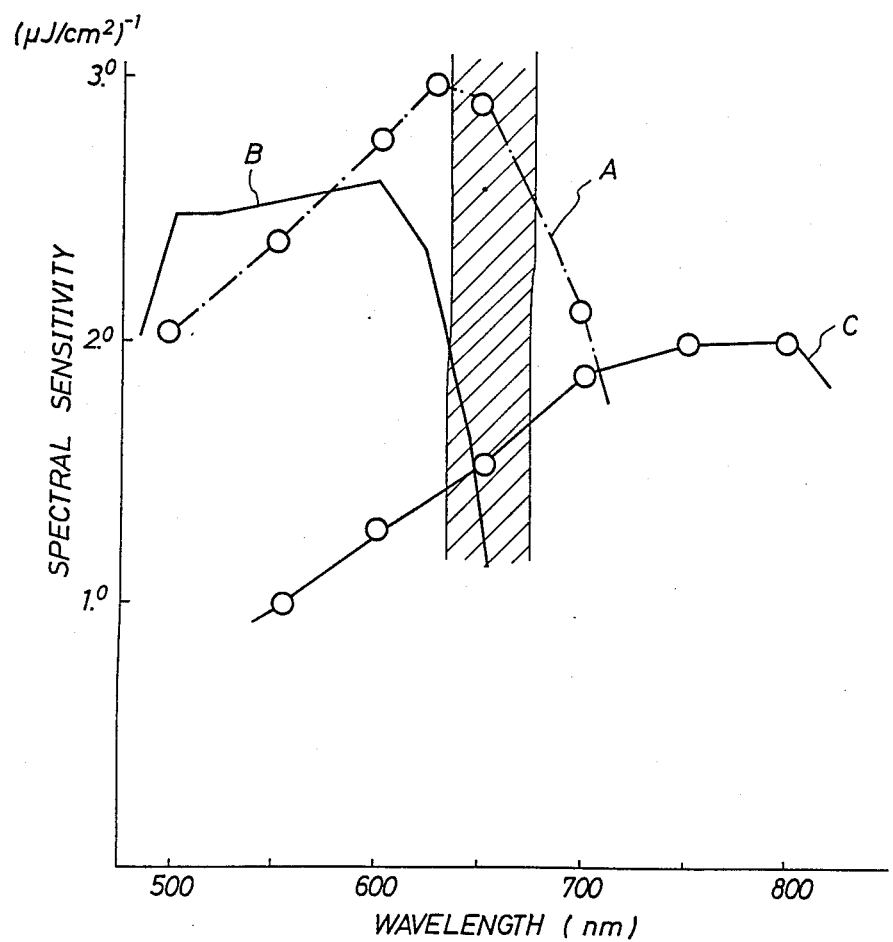
FIG. 1 represents the spectral sensitivities of disazo products. Line A of FIG. 1 represents the product of Example 1. Lines B and C represent commercially avaliable, conventional photoreceptors. The shadow area of FIG. 1 represents the wavelength range of an LED printer.

It is an object of this invention to provide OPC with an excellent sensitivity and durability.

It is another object of this invention to provide the electrophotographic photoreceptor comprising such OPC.

In accordance with the present invention, the electrophotographic photoreceptor having the excellent sensitivity and durability may be obtained by using the specified bis-azo compound as the OPC.

Accordingly, there is provided by the present invention an electrophotographic photoreceptor having on a conductive base a photosensitive layer comprising a bis-azo compound represented by the general formula (I):

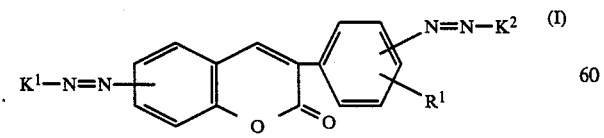

wherein
$K^1$ and $K^2$ are independently a coupling ingredient residue with a hydroxy group which has a coupling activity; $R^1$ is a hydrogen atom, a lower alkyl group, a lower alkoxy group or a halogen atom.

As the coupling ingredient residue with the above hydroxy group, the groups (II)–(VI) may be exemplified. The term "a hydroxy group which has a coupling activity" means in this specification the hydroxy group which can provide the groups such as an aromatic ring to which the hydroxy group is bound with the coupling activity with a diazonium salt.

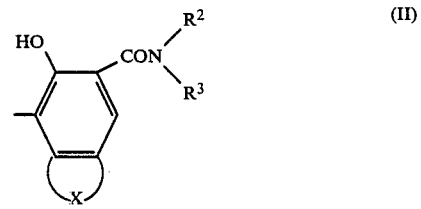

wherein
X is a residue which, upon condensation with a benzene ring, can form a polycyclic aromatic or heterocyclic ring such as a naphthalene ring, anthracene ring, carbazole ring, benzcarbazole ring, dibenzofuran ring, benzonaphthofuran ring or diphenylsulfide ring; $R^2$ and $R^3$ are independently a hydrogen atom; an unsubstituted or substituted alkyl group such as methyl, ethyl, propyl or butyl; an unsubstituted or substituted aralkyl group such as benzyl, phenethyl or naphthylmethyl; an unsubstituted or substituted aryl group such as phenyl, diphenyl or naphthyl; an unsubstituted or substituted heterocyclic group such as carbazole, dibenzofuran, benzimidazolone, benzthiazole, thiazole or pyridine; or $R^2$ and $R^3$ may be joined to form an unsubstituted or substituted cyclic amine group with the nitrogen atom to which they are attached. Though $R^2$ and $R^3$ may be the same or different, it is preferable in view of sensitivity that one is a hydrogen atom and the other is the above group other than the hydrogen atom.

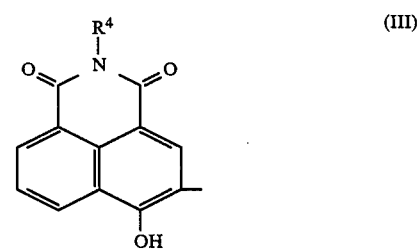

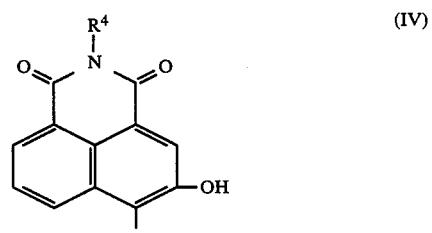

wherein
$R^4$ is the alkyl, aralkyl or aryl as defined for $R^2$ and $R^3$ above.

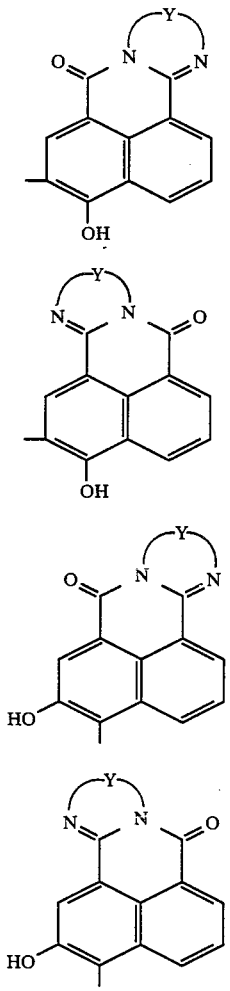

(V-a)

(V-b)

(VI-a)

(VI-b)

wherein
Y is a divalent aromatic hydrocarbon group or divalent heterocyclic ring group having a nitrogen atom therein.

As the divalent aromatic hydrocarbon group, there may be mentioned the divalent group of a monocyclic aromatic hydrocarbon such as o-phenylene or the divalent group of a condensed polycyclic aromatic hydrocarbon such as o-naphthylene, peri-naphthylene, 1,2-anthraquinonylene or 9,10-phenanthrylene.

As the divalent heterocyclic ring having nitrogen, there may be mentioned that having preferably at most two hydrogen atoms in a 5-10 member ring such as 3,4-pyrazoldiyl, 2,3-pyridindiyl, 5,5-pyrimidindiyl, 6,7-indazoldiyl, 5,6-benzimidazoldiyl, 6,7-quinolindiyl.

On consideration of the sensitivity and durability of the elecrophotographic photoreceptor of the present invention, Y is preferably o-phenylene, o-naphthylene, peri-naphthylene, 2,3-pyridindiyl or 4,5-pyrimidindiyl, more preferably o-phenylene or o-naphthylene.

Y may be substituted with any substituent, for example, alkyl such as methyl, ethyl, n-propyl, i-propyl, n-butyl, i-butyl or n-hexyl; alkoxy such as methoxy, ethoxy, propoxy or butoxy; hydroxy; nitro; cyano; amino; substituted amino such as dimethylamino, diethylamino or dibenzylamino; halogen such as fluorine, chlorine, bromine or iodine; carboxy; alkoxycarbonyl such as ethoxycarbonyl; carbamoyl; aryloxy such as phenoxy; arylalkoxy such as bezyloxy; aryloxycarbonyl such as phenyloxycarbonyl. Among them, alkyl, alkoxy, nitro, halogen, hydroxy and carboxy are preferable, and methyl, methoxy, nitro, chlorine and hydroxy being particularly preferable.

Since the compounds of the general formulae of (V-a) and (V-b), which are isomers to each other, usually co-exist in mixture, they are considered as identical with each other in the context of the present specification. It is the same with the compounds of the general formulae of (VI-a) and (VI-b).

$R^1$ in the general formula (I) may be, for example, methyl, ethyl, propyl, methoxy, ethoxy, fluorine, chlorine or bromine.

The bis-azo compound according to the present invention may be easily prepared by converting aromatic diamine represented by the general formula (VII):

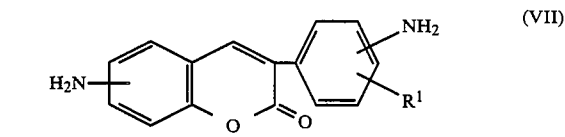

(VII)

wherein
$R^1$ is as defined above, into a corresponding tetrazonium salt compound in a conventional manner and subjecting the resultant product to a known coupling reaction with one or two kinds of the desired coupling ingredients.

Upon use of two kinds of the above coupling ingredients, there may be prepared a mixture of the following four bis-azo compounds:

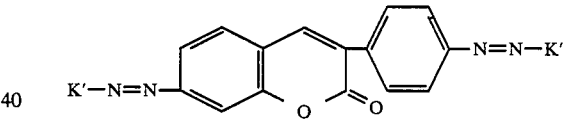

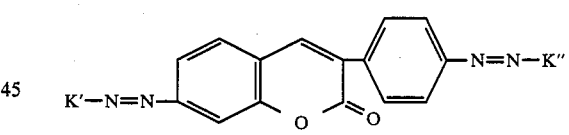

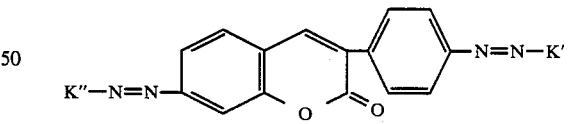

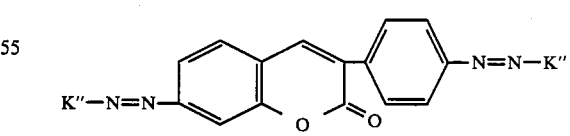

Where the process used in SYNTHESIS EXPERIMENT 1 set forth below is applied to the above preparation, the asymmetric bis-azo compound having the different coupling ingredients may be obtained in an amount of more than 50% of the total mixture.

In accordance with the present invention, $K^1$ and $K^2$ are preferably different to each other in view of sensitivity. Particularly, the two different coupling ingredients with a low similarity therebetween are more preferably used. That is, if one is the compound of (II), the other should be the compound other than (II). Alternatively, if one is the compound of (III) or (IV), the other should be (II), (V) or (VI), or where one is (V) or (VI), the other should be (II), (III) or (IV).

The coupling reaction is generally carried out in water and/or organic solvent such as dimethylformamide or dimethylsulfoxide at a temperature of not more than 30° C. for about 1 to 10 hours.

The aromatic diamine compound (VII) may be prepared in accordance with the following reaction scheme.

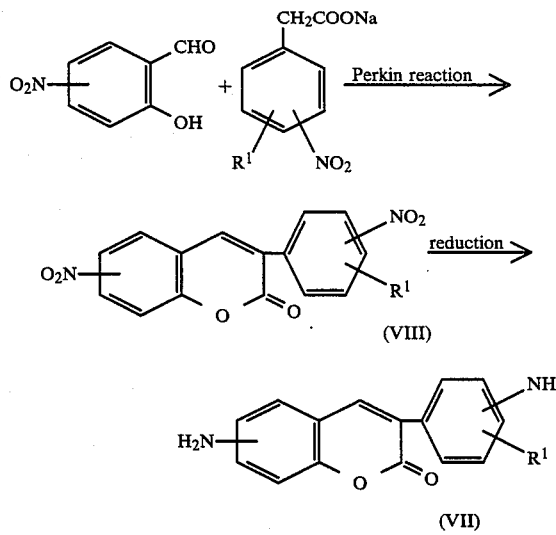

In the above, Perkin reaction may be performed under known conditions, for example, in an acetic anhydride, and the reduction may be carried out in the presence of a known catalyst mixure of an acid such as hydrochloric acid or acetic acid and an iron powder, zinc or tin chloride, giving the final product in a high yield.

Alternatively, the compound of (VII) may be synthesized by the following reaction steps:

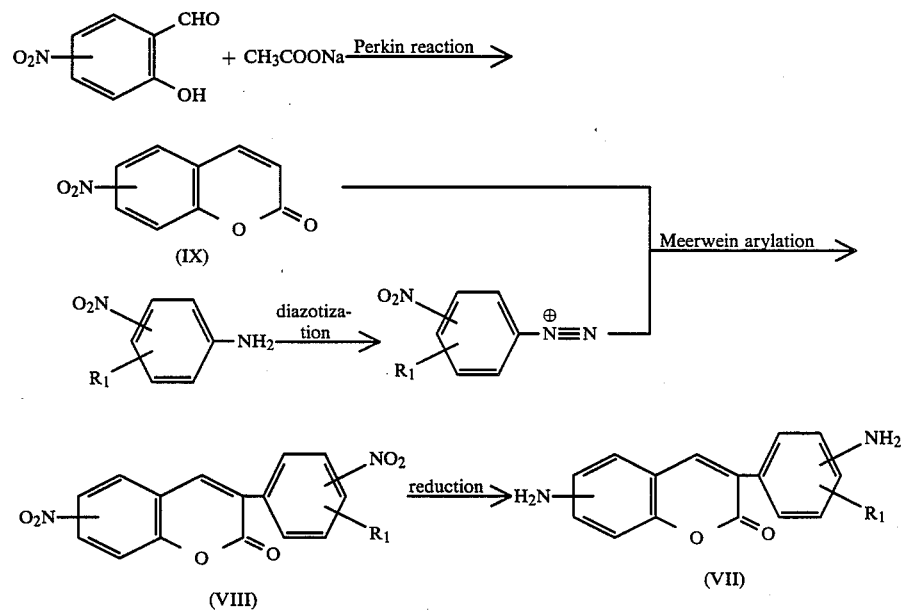

wherein a mononitro compound (IX) prepared by Perkin reaction and the diazonium salt obtained in a conventional manner are subjected to Meerwein arylation in acetone in the presence of cuprous chloride to give the compound (VIII), which is followed by reduction in the same way as the above so as to prepare the compund (VII).

The present bis-azo compound may be incorporated into the photosensitive layer of the electrophotographic photoreceptor in any known form. Preferably, it is dispersed in a binder (polymer) to form a generating layer for generating a charge carrier. The generating layer thus formed is then combined with a transporting layer comprising a known medium for transporting the charge carrier so as to construct a laminated-typed photosensitive layer. Alternatively, the above medium may be added to the generating layer to produce a single layer-typed photosensitive layer.

The bis-azo compound according to the present invention may be advantageously used as the material for generating the charge carrier in the photosensitive layers of the above types since it has such excellent properties as to generate and inject the charge carrier into the medium in a high efficiency.

The charge carrier transporting medium usable in combination with the bis-azo compound of the present invention may be classified into two general types, i.e., an electron transporting one and hole transporting one, both of which may be used singly or by mixture in the photosensitive layer. The electron transporting medium may include an electron-attracting compound having an electron-attracting group such as nitro, cyano or ester, for example, a nitrated fluorenone such as 2,4,7-trinitrofluorenone or 2,4,5,7-tetranitrofluorenone, and tetracyanodimethane. The hole transporting medium may include an electron-donating photoconductive organic compound such as a heterocyclic compound such as carbazole, indole, imidazole, oxazole, thiazole, oxadiazole, pyrazole, pyrazoline or thiadiazole; a triarylalkane derivative such as triphenylmethane; a triarylamine derivative such as triphenylamine; phenylenediamine derivative; a N-phenylcarbazole derivative; a stilbene derivative; a hydrazone compound and a polymer having, on its principal or side chain, the group derived from the above-mentioned compounds such as polyvinylcarbazole. Among them, substituted amino such as dialkylamino or diphenylamino, an electron-donating group such as alkoxy or alkyl, or the compound with the substituent of the aromatic ring which is substituted with the electron-donating group are preferably used. As the hydrazone compound, that which is represented by the general formula (X) below is preferably used in the present invention:

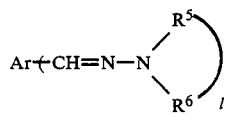 (X)

wherein
Ar is an unsubstituted or substituted aromatic hydrocarbon group such as phenyl, styryl or naphthyl, or a heterocyclic group such as carboazolyl; $R^5$ and $R^6$ are independently an alkyl group such as methyl or ethyl; an aryl group such as phenyl or naphthyl; an aralkyl group such as benzyl, 1 represents an integer of 1 or 2, provided that at least one of $R^5$ and $R^6$ is the aryl group.

The electrophotographic photoreceptor according to the present invention may be formed in accordance with a conventional method.

Thus, the electrophotographic photoreceptor has the laminated-typed photosensitive layer on the conductive base. The photosensitive layer of this type consists of the generating layer which comprises the bis-azo compound of the present invention and the transporting layer. It may also have on the conductive base the single layer-typed photosensitive layer comprising the bis-azo compound of the present invention dispersed therein.

If necessary, an intermediate layer such as an adhesive layer and a transparent insulating layer and a protecting layer may be provided in the electrophotographic photoreceptor in order to improve its electrical and/or mechanical properties.

As the conductive base on which the photosensitive layer is to be formed, any one of those used for known electrophotographic photoreceptors is available. By way of example, there may be mentioned a drum or sheet of a metal such as aluminum or copper, and a laminate or deposit of such metals. Alternatively, a film, sheet, drum or pipe made of plastic or paper on which a conductive material such as metal powder, carbon black, carbon fiber, copper iodine or polymeric electrolyte in a suitable binder is coated may be used as the conductive base. Furthermore, a plastic drum or paper in which the conductive material is contained so as to show electroconductivity may be used as the conductive base. A plastic film having thereon a layer of conductive metal oxide such as indium oxide or tin oxide may be also included in the conductive base usable in the present invention.

Although the transporting layer is usually laminated on the generating one which is in turn positioned on the conductive base, it may be also provided between the generating layer and the conductive base.

The generating layer of the present invention may be formed by any suitable method. For example, a coating solution containing the present bis-azo compound dissolved or dispersed therein and the binder polymer in a suitable solvent is coated on the conductive base followed by drying to form the generating layer. The generating layer generally has the thickness of 0.05 to 5 μm, preferably 0.1 to 2 μm.

The solvent used in the coating solution is preferably selected from the followings: a basic medium such as butylamine or ethylenediamine; ether such as tetrahydrofuran or 1,4-dioxane; ketone such as methylethyl ketone, cyclohexanone; aromatic hydrocarbon such as toluene or xylene; aprotic polar solvent such as N,N-dimethylformamide, acetonitrile, N-methylpyrrolidone or dimethylsulfoxide; alcohol such as methanol, ethanol or isopropanol; ester such as ethyl acetate, methyl formate or methylcellosolve acetate; chlorinated hydrocarbon such as dichloroethane or chloroform.

As the binder polymer, there may be mentioned a homo- or co-polymer of vinyl compounds such as styrene, vinyl acetate, acrylic acid ester, methacrylic acid ester, vinyl alcohol, ethylvinyl ether, a phenoxy resin; polysulfone; polyvinylacetal; polycarbonate; polyester; polyamide; polyurethane; cellulose ester; cellulose ether; an epoxy resin; a silicone resin.

The binder polymer is generally used in an amount of 0.05 to 5 parts, preferably 0.2 to 3 parts by weight against 1 part by weight of the bis-azo compound without limitation. The dispersed particles of the bis-azo compound in the coating solution should be not more than 1 μm, preferably not more than 0.5 μm in diameter.

The coating solution may further contain a dispersant, an additive for improving a film-formability and/or the other properties of the coating to be obtained, such as dye or an electron-attracting compound.

The transporting layer may be formed in a similar manner with that for forming the generating layer. When the charge-carrier transporting medium is a low-molecular compound, it is recommendable to add the above-mentioned binder polymer in a coating solution for forming the transporting layer. On the contrary, the binder polymer is not necessary for the coating solution containing the high-molecular transporting medium which is film-formable by itself, the addition of the binder being however meaningful for improving the flexibility of the resultant transporting layer. The binder polymer is in such case generally used in an amount of 0.5 to 30, preferably 0.7 to 10 parts by weight against to 1 part by weight of the charge-carrier transporting medium. The transporting layer has the thickness of generally 5 to 50 μm, preferably 10 to 30 μm.

The transporting layer may further contain various kinds of additives such as an electron-attracting compound, dye, stabilizer such as ultraviolet ray absorber or antioxidant, plasticizer or cross-linkling agent in order to improve its mechanical properties, durability, film-formability and the like.

The representatives of the electron-attracting compound are quinone such as chloranil, 2,3-dichloro-1,4-naphthaoquinone, 2-methylanthraquinone, 1-nitroanthraquinone, 1-chloro-5-nitroanthraquinone, 2-chloroanthraquinone or phenanthrenequinone; aldehyde such as 4-nitrobenzaldehyde; ketone such as 9-benzoylanthracene, indandione, 3,5-dinitrobenzophenone or 3,3',5,5'-tetranitrobenzophenone; acid anhydride such as phthalic acid anhydride or 4-chloronaphthalic acid anhydride; a cyano compound such as tetracyanoethylene, terephthalalmalononitrile, 4-nitrobenzalmalononitrile, 4-benzoyloxybenzamalonitrile or 4-(p- nitrobenzoyloxy)benzalmalononitrile; phthalide such as 3-benzalphthalide, 3-(alpha-cyano-p-nitrobenzal)phthalide or 3-(alpha-cyano-p-nitrobenzal)-4,5,6,7-tetrachlorophthalide.

The single layer-typed photosensitive layer of the present invention may be obtained by dissolving one or more charge carrier transporting media into the above-mentioned coating solution used for forming the generating layer, followed by drying the solution thus obtained on the conductive base to 5 to 50 μm, preferably 10 to 30 μm in thickness. The used amount of the binder polymer and the charge carrier transporting media is usually 1 to 100 parts, preferably 3 to 50 by weight and 0.5 to 100, preferably 2 to 50 parts by weight, respectively, to 1 part by weight of the bis-azo compound.

The present electrophotographic photoreceptor having the photosensitive layer in which the bis-azo compound is contained has the following advantages:
photographic sensitivity is high;
color sensitivity is high;
there is little change in photographic sensitivity, residual potentials and chargeability even after a repeated use;
fatigue against light is little; and
durability and stability are extremely good.

Owning to the above-mentioned advantages, the photoreceptor according to the present invention can find its application in a laser printer, liquid crystal printer, shutter printer and light emitting diode (LED) printer which require stability and reliability of their properties as well as an usual electrophotographic copying machine. For example, the photoreceptor of EXAMPLE 1 set forth below is suitable for use in the LED printer because it has a maximum spectral sensitivity around 650 nm as is represented by LINE A in FIG. 1. The maximum range is almost identical to that of an oscillating wave length of the LED printer as shown by shadow in FIG. 1. LINEs B and C in FIG. 1 represent spectral sensitivities of conventional photoreceptors for used in an usual copying machine and a laser printer, respectively, which are commercially available.

This invention will be more specifically illustrated by the following non-limiting examples. In the following description, the term "part(s)" means "part(s) by weight" unless otherwise specifically stated therein.

SYNTHESIS EXPERIMENT 1

13.8 parts by weight of 3-hydroxynaphthalic anhydride (manufac. by TOKYO KASEI KOGYO CO., Ltd.) and 9.2 parts by weight of o-phenylenedamine (manufac. by TOKYO KASEI KOGYO CO., Ltd.) were dissolved in a mixed solvent of 30 parts by weight of acetic acid and 150 parts by weight of nitrobenzene while stirring and reacted at boliing temperature of acetic acid for 2 hours. After the completion of the reaction, a reaction mixture was cooled to a room temperature so as to crystallize out followed by collecting the crystals thus obtained, washing with methanol and drying them to give 17.8 parts by weight of crystalline product which was yellow in color and feathery in form.

The characteristics of the final product were as follows:
(1) melting point: more than 320° C.;
(2) elementary analysis: C₁₈H₁₀O₂N₂

|  | C (%) | H (%) | N (%) |
|---|---|---|---|
| theoretical | 75.54 | 3.53 | 9.78 |
| experimental | 75.50 | 3.49 | 9.72 |

According to the above-mentioned data and IR spectrum, it was confirmed that the product was 2-hydroxy and 5-hydroxy-7H-benzimidazo-(2,1-a)benzo-(de)isoquinoline-7-one.

1.7 parts by weight of 2-hydroxy or 5-hydroxy-7H-benzimidazo-(2,1-a)benzo-(de)isoquinoline-7-one obtained above and 1.6 parts of 2-hydroxy-3-phenylcarbamoylnaphthalene were stirred in 700 parts of dimethylsulfoxide at 20° C., to which tetrazonium borofluoride salt of the compound represented by the general formula:

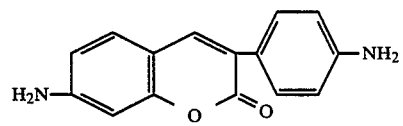

in dimethylsulfoxide and a solution of 2.4 parts by weight of sodium acetate and 24 parts by weight of water was successively added dropwise to start a coupling reaction. After the reaction was continued for 3 hours with stirring, the resulting product was collected by a conventional method followed by washing with water, methanol and tetrahydrofuran successively to give a deep purple solid.

The product thus obtaind had a melting point of more than 320° C. and was a mixture of the following four compounds:

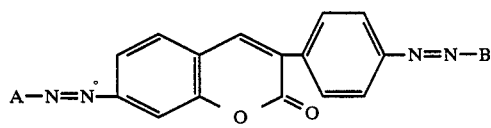

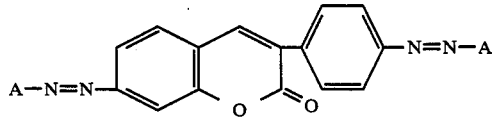

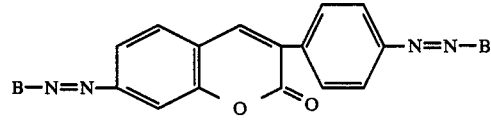

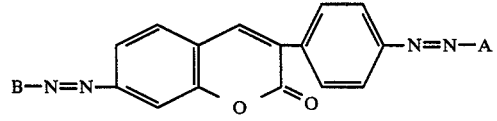

-continued

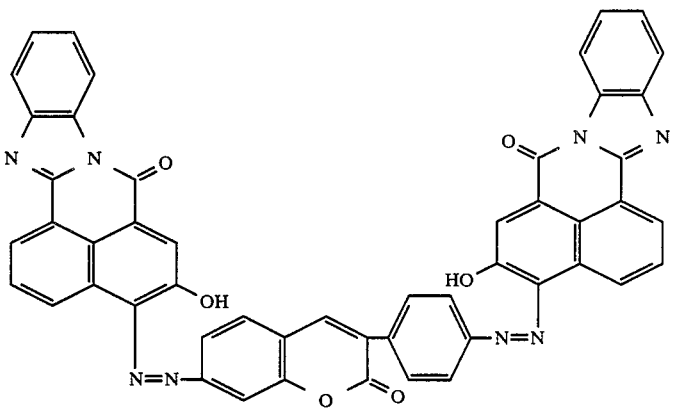

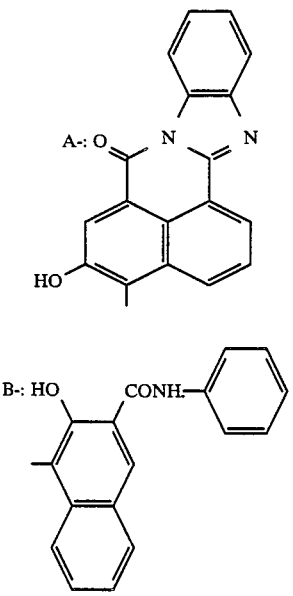

Figure 2:
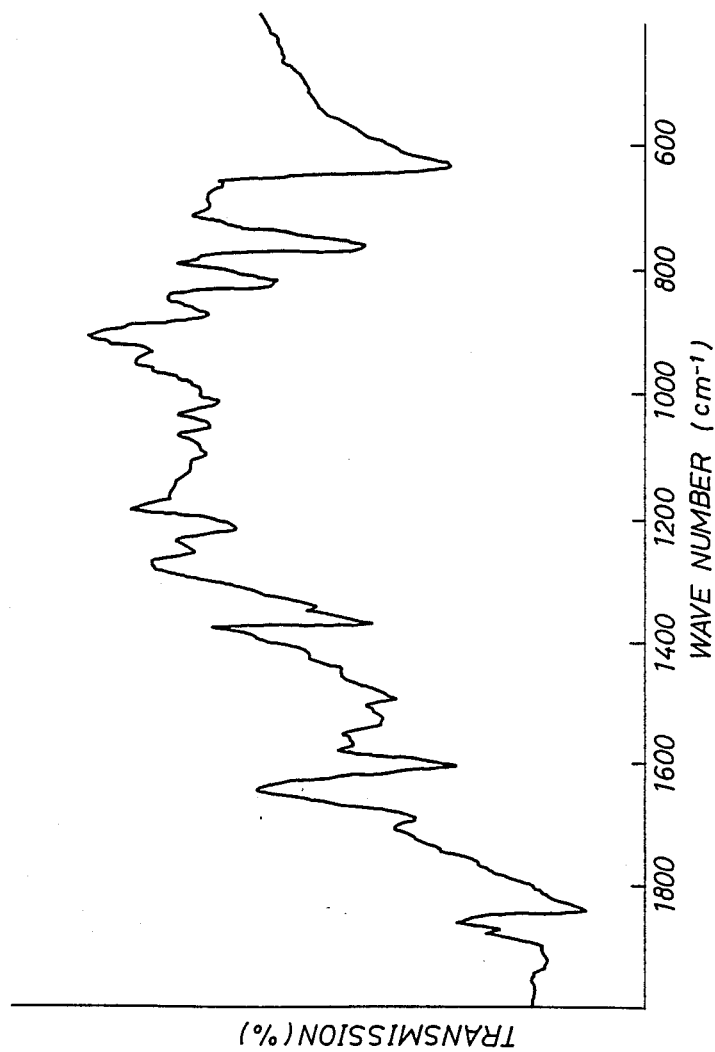

The product has the IR spectrum as shown in FIG. 2.

The bis-azo compounds used in EXAMPLEs 1 to 32 were prepared in th same or similar way with that in SYTHESIS EXPERIMENT 1. All of them comprised about 60 to 70% of the bis-azo compound having the two coupling ingredient residues which are different to each other in the same molecule.

SYTHESIS EXAMPLE 2

The bis-azo compound according to this invention was prepared in the same manner as in SYNTHESIS EXPERIMENT 1 except that 2-hydroxy-3-phenylcarbamoylnaphthalene was not used and dimethylsulfoxide was used in an amount of 500 parts by weight so as to give 1.8 parts by weight of a deep purple solid with a melting point of more than 320° C.

The elementary analysis was as follows: $C_{51}H_{26}O_6N_8$

|  | C (%) | H (%) | N (%) |
|---|---|---|---|
| theoretical | 72.34 | 3.09 | 13.23 |
| experimental | 72.11 | 3.02 | 13.14 |

Figure 3:
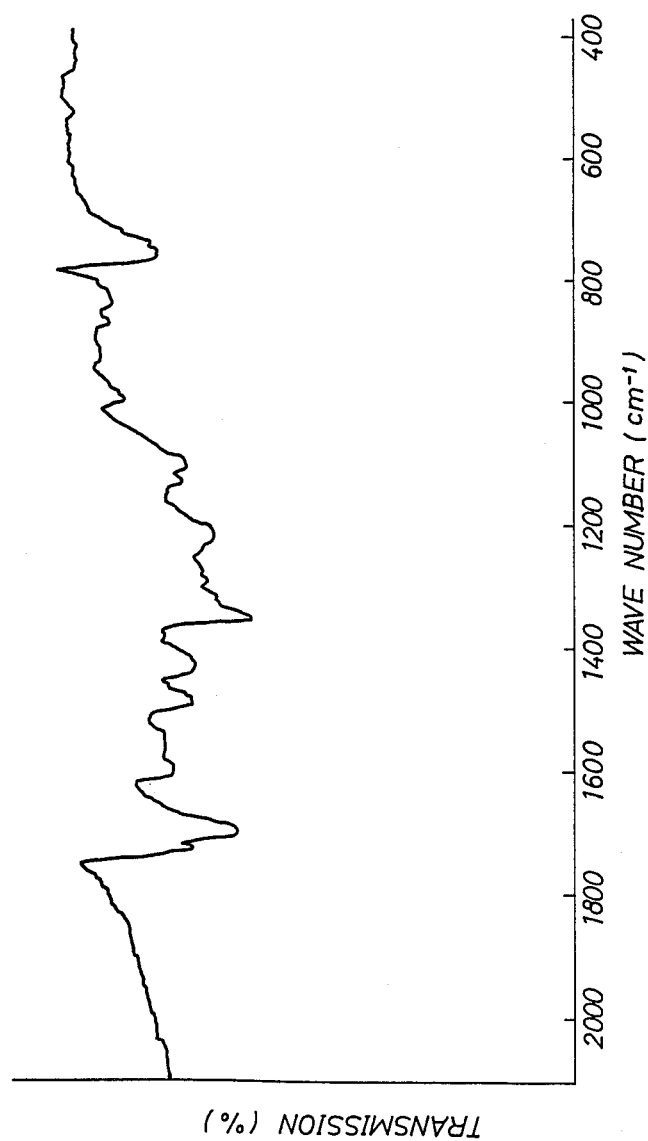

The above elementary anaysis and the IR spectrum as shown in FIG. 3 identified the product as the bis-azo compound of the general formula:

Although the coupling ingredient in the above formula corresponds to (VI-a), it shoud be understand that it can also take the structure of (VI-b) as described above because (VI-a) and (VI-b) are isomers with each other. Accordingly, the above bis-azo compound actually consists of the isomer mixture having four differnt sets of the coupling ingredient residue pair.

The bis-azo compounds used in EXAMPLEs 33 to 96 were prepared in the same or similar way with that in SYTHESIS EXPERIMENT 2.

EXAMPLES 1 to 32

With 30 parts by weight of 4-methoxy-4-methyl-pentanone-2 (manufac. by MITSUBISHI CHEMICAL INDUSTRIES LIMITED), 0.4 parts by weight of the bis-azo compound of the general formula (I) was dispersed by means of a sand grinder. To the dispesion, 0.2 parts by weight of polyvinyl butylal (manufac. by Sekisui Chemical Co., Ltd., a tradename "S-LEC BH-3") and 0.2 parts by weight of a phenoxy resin (Union Carbide Co., a tradename "DKHH") were added and dissolved. The dispersion thus prepared was coated by means of a wire bar on an aluminum layer deposited on a polyester film of 75 μm in thickness so as to provide a dried film of 0.2 g/m² in thickness. On the generating layer thus formed, a solution comprising of 90 parts by weight of N-ethylcarbazole-3-aldehyde-diphenylhydrazone, 2 parts by weight of 4-(p-nitrobenzoyloxy)benzalmalononitrile and 100 parts by weight of a polycarbonate resin (manufac. by Mitsubishi Gas Chemical Company, Inc., a tradename "IUPILON E-2000") in 670 parts by weight of dioxane was coated to give the transporting layer made of a dried film of 13 μm in thickness. In this way, a electrophotographic photoreceptor having a two-layered photosensitive layer was constructed.

The sensitivities of the photoreceptors were examined on the basis of half-exposure ($E_{\frac{1}{2}}$) determined as follows.

The photoreceptor was submitted to a corona discharge of −6.5 KV in dark so a to charge the surface of the photoreceptor and then the surface of the photoreceptor was irradiated by a white light of 5 lux till the surface voltage was reduced by half of the initial surface voltage. The surface voltage was measured by means of a testing electrostatic copying machine (Model SP-428, manufac. by Kawaguchi Electric Works, Ltd.). The half-exposure was calculated from the time required for reducing by half of the initial surface voltage. The results are summarized in TABLE 1.

TABLE 1

| EX-AMPLE | COUPLING INGREDIENT RESIDUE | | $E_{\frac{1}{2}}$ lux.sec |
|---|---|---|---|
| 1 | (naphthalene with CH₃, OH, and N=C-N-C=O ring fused to phenyl) | (naphthalene with CH₃, OH, and CONH-phenyl) | 1.0 |
| 2 | (naphthalene with CH₃, OH, and N=C-O-N-C=O fused to phenyl) | (naphthalene with OH, CH₃, and N(C=O)₂ ring with 4-NO₂-phenyl) | 2.4 |
| 3 | (naphthalene with CH₃, OH, and N=C-N-C=O fused to 3,4-diCH₃-phenyl) | (naphthalene with OH, CH₃, and N(C=O)₂ ring with 3-Cl-phenyl) | 1.9 |
| 4 | (naphthalene with CH₃, OH, and N=C-N-C=O fused to Cl-phenyl) | (naphthalene with OH, CH₃, and N(C=O)₂ ring with phenyl) | 1.7 |

TABLE 1-continued

| EX-AMPLE | COUPLING INGREDIENT RESIDUE | | $E_{\frac{1}{2}}$ lux.sec |
|---|---|---|---|
| 5 | | | 5.1 |
| 6 | | | 1.1 |
| 7 | | | 5.6 |

TABLE 1-continued

| EX-AMPLE | COUPLING INGREDIENT RESIDUE | | $E_{\frac{1}{2}}$ lux.sec |
|---|---|---|---|
| 8 | (naphthol with NHOC-phenyl-C₂H₅ substituent) | (bis-azo naphthol structure with naphthalene) | 8.1 |
| 9 | (naphthol with NHOC-phenyl-C₂H₅ substituent) | (bis-azo naphthol with pyridine) | 12.7 |
| 10 | (naphthol with NHOC-phenyl-Cl substituent) | (bis-azo naphthol with naphthalene) | 1.5 |

TABLE 1-continued

| EX-AMPLE | COUPLING INGREDIENT RESIDUE | | $R^1$ | $E_{\frac{1}{2}}$ lux.sec |
|---|---|---|---|---|
| 11 | [naphthol with azo to o-phenyl and NHOC-C6H4-Br] | [naphthol-OH, CH3, NHOC-phenyl-Br] | [chromene with p-tolyl] | 1.2 |
| 12 | [bis-azo naphthol structure with OH groups] | [naphthol-OH, CH3, NHOC-phenyl] | [chromene with o-tolyl] | 5.6 |
| 13 | [bis-azo naphthol with p-tolyl (H3C)] | [naphthol-OH, CH3, NHOC-phenyl, NH-o-phenyl] | [chromene with m-tolyl] | 1.3 |

TABLE 1-continued
| EX-AMPLE | COUPLING INGREDIENT RESIDUE | | | $E_{\frac{1}{2}}$ lux.sec |
|---|---|---|---|---|
| 14 | 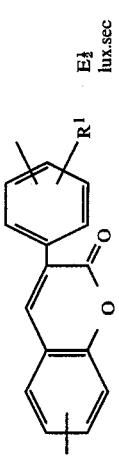 | 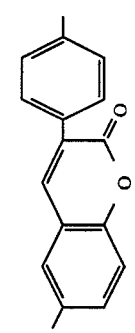 | | 14.5 |
| 15 | 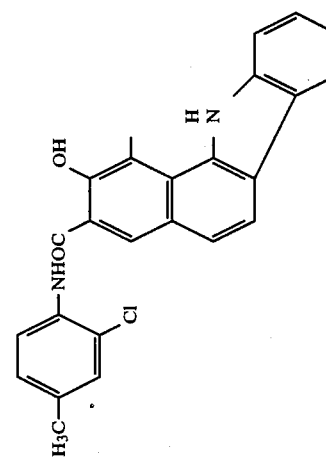 | 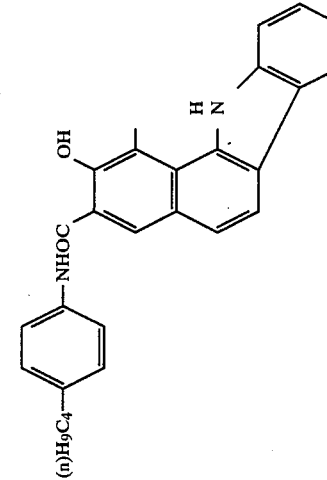 | | 1.8 |

TABLE 1-continued
| EX-AMPLE | COUPLING INGREDIENT RESIDUE | | $E_{\frac{1}{2}}$ lux.sec |
|---|---|---|---|
| 16 | 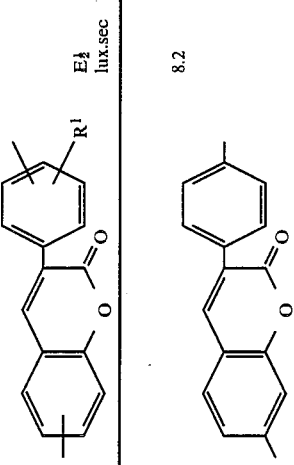 | 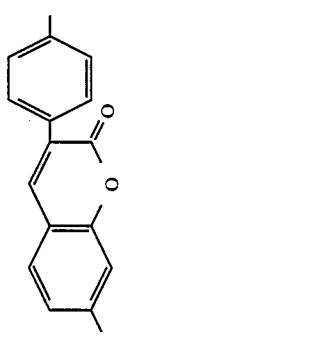 | 8.2 |
| 17 | 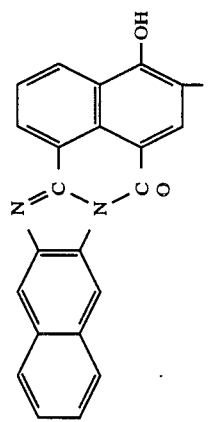 | 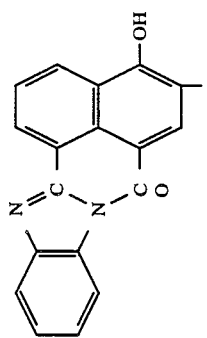 | 1.0 |

TABLE 1-continued

| EXAMPLE | COUPLING INGREDIENT RESIDUE | R¹ | E½ lux.sec |
|---|---|---|---|
| 18 | (naphthalene with OH, CH₃, and N-methylimide substituents); coupled to naphthol-NHOC-(2-chlorophenyl) | OCH₃ | 2.2 |
| 19 | (naphthalene with OH, CH₃, and N-n-propylimide substituents); coupled to naphthol-NHOC-(4-cyanophenyl) | H | 2.4 |
| 20 | (naphthalene with OH, CH₃, and N-phenylimide substituents); coupled to naphthol-NHOC-(2-chloro-4-methylphenyl) | H | 3.5 |

TABLE 1-continued

| EX-AMPLE | COUPLING INGREDIENT RESIDUE | | $E_{\frac{1}{2}}$ lux.sec |
|---|---|---|---|
| 21 | | | 2.1 |
| 22 | | | 4.3 |
| 23 | | | 1.1 |

TABLE 1-continued

| EX-AMPLE | COUPLING INGREDIENT RESIDUE | | $E_{\frac{1}{2}}$ lux.sec |
|---|---|---|---|
| 24 | (1-hydroxy-naphthalene-4,5-dicarboximide, N-methyl) | (3-hydroxy-4-methyl-naphthalene-2-carboxanilide, 3'-nitro) | (3-methyl coumarin with tolyl substituent, $R^1$) 1.1 |
| 25 | (1-hydroxy-naphthalene-4,5-dicarboximide, N-phenyl) | (3-hydroxy-4-methyl-naphthalene-2-carboxanilide, 2'-fluoro) | 0.9 |
| 26 | (1-hydroxy-naphthalene-4,5-dicarboximide, N-ethyl) | (3-hydroxy-4-methyl-naphthalene-2-carboxamide, N-methyl) | (coumarin with Cl substituent) 1.2 |

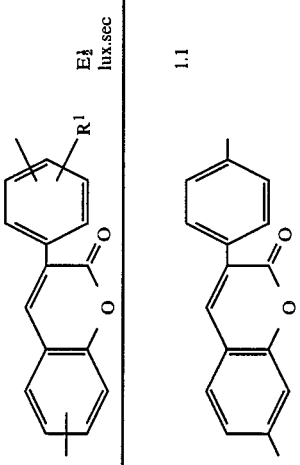

TABLE 1-continued

| EX-AMPLE | COUPLING INGREDIENT RESIDUE | | $E_{\frac{1}{2}}$ lux.sec |
|---|---|---|---|
| 29 | (naphthol with phenyl-CH₂-N(C=O)₂ fused ring) | (methylnaphthol with NHOC-pyridyl) | 9.1 |
| 30 | (methylnaphthol with NHOC-phenyl-COCH₃) | (complex naphthol with NH-phenyl and NHOC-phenyl-N(CH₃)₂) | 14.1 |

TABLE 1-continued
| EX-AMPLE | COUPLING INGREDIENT RESIDUE | | $E_{\frac{1}{2}}$ lux.sec |
|---|---|---|---|
| 31 | 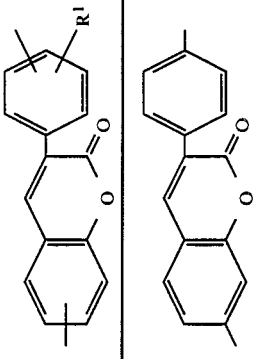 | 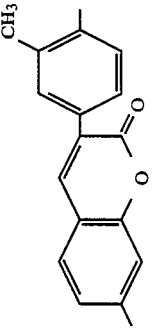 | 10.3 |
| 32 | 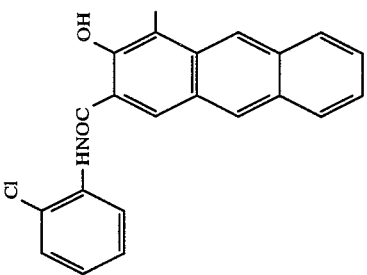 | 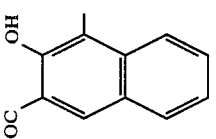 | 8.5 |

EXAMPLES 33 to 96

The electrophotographic photoreceptors were formed in the same manner as in EXAMPLE 1 except that the bis-azo compounds used here were those prepared in the same or similar method with that in SYTHESIS EXPERIMENT 2 in which the only one coupling ingredient was incorporated to prepare the bis-azo compounds. The sensitivies of the photoreceptors were determined as in EXAMPLE 1. The results are shown in TABLE 2.

Figure 4:
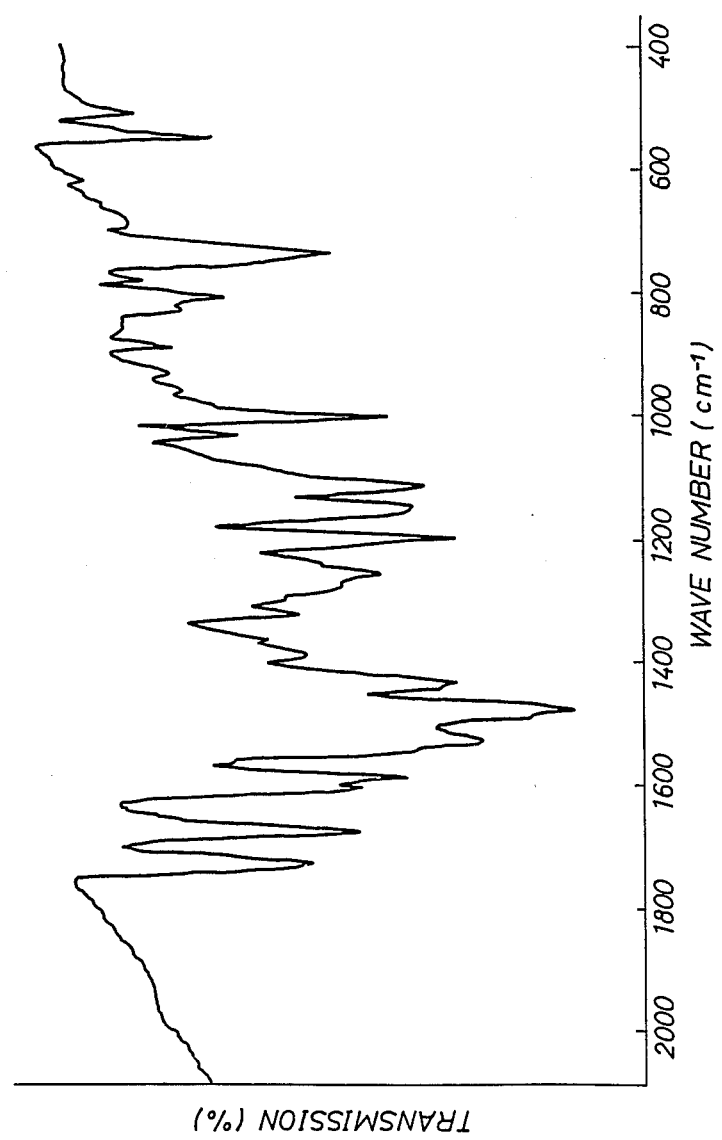

The IR spectra of the compounds used in EXAMPLEs 33 and 48 are shown in FIG. 4 and FIG. 5, respectively.

TABLE 2

| EXAMPLE | COUPLING INGREDIENT RESIDUE | 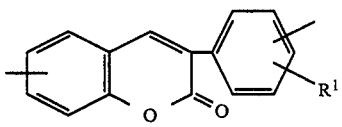 R¹ | $E_{\frac{1}{2}}$ lux · sec |
|---|---|---|---|
| 33 | 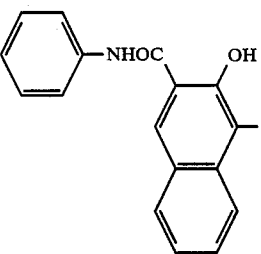 | 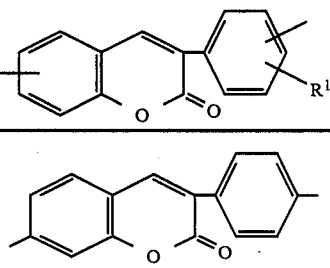 | 3.4 |
| 34 | 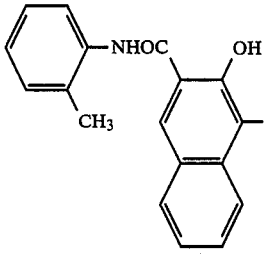 | 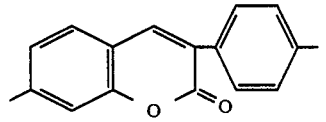 | 4.1 |
| 35 | 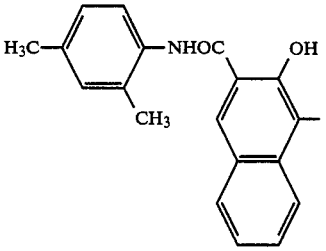 | 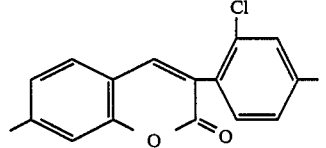 Cl | 3.7 |
| 36 | 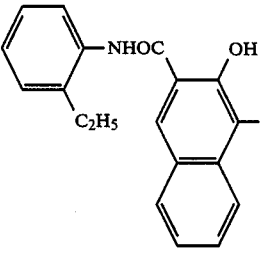 | 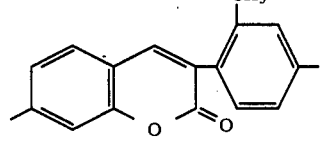 CH₃ | 4.2 |
| 37 | 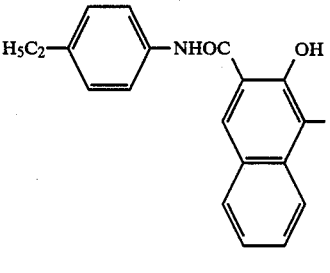 | 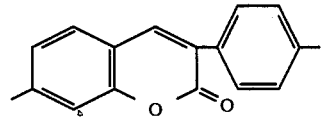 | 3.1 |

TABLE 2-continued

| EX-AMPLE | COUPLING INGREDIENT RESIDUE | Structure (R¹) | E½ lux·sec |
|---|---|---|---|
| 38 | 4-Cl-C₆H₄-NHOC-(3-OH, 4-methyl-2-naphthyl) | (4-methylphenyl, 5-methylbenzofuranone) | 3.3 |
| 39 | 4-Br-C₆H₄-NHOC-(3-OH, 4-methyl-2-naphthyl) | (2-methylphenyl, 5-methylbenzofuranone) | 4.0 |
| 40 | C₆H₅-NHOC-(3-OH, 4-methyl-2-naphthyl) | (2-OCH₃-phenyl, 5-methylbenzofuranone) | 2.9 |
| 41 | 2-F-C₆H₄-NHOC-(3-OH, 4-methyl-2-naphthyl) | (2-methylphenyl, 4-methylbenzofuranone) | 3.2 |
| 42 | 3-O₂N-C₆H₄-NHOC-(3-OH, 4-methyl-2-naphthyl) | (3-CH₃,4-methylphenyl, 4-methylbenzofuranone) | 5.6 |

TABLE 2-continued
| EX-AMPLE | COUPLING INGREDIENT RESIDUE | 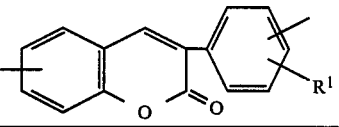 | $E_{\frac{1}{2}}$ lux·sec |
|---|---|---|---|
| 43 | 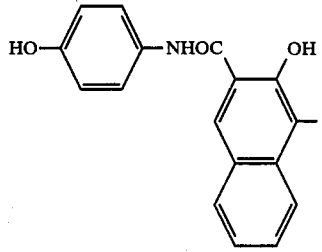 | 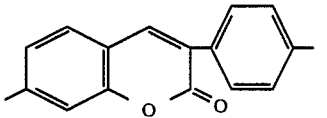 | 6.9 |
| 44 | 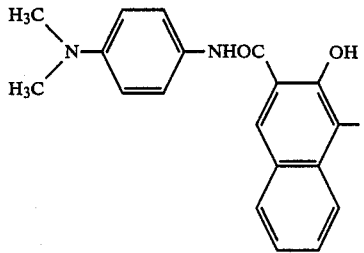 | 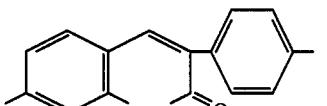 | 4.8 |
| 45 | 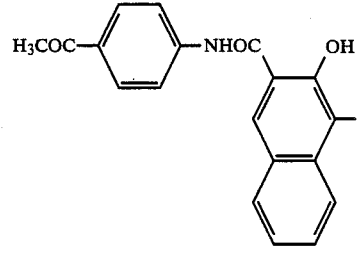 | 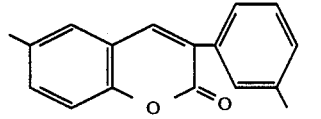 | 3.1 |
| 46 | 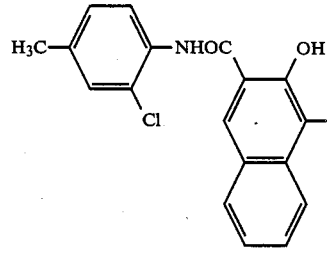 | 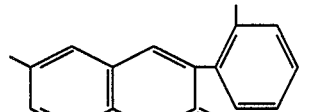 | 2.5 |
| 47 | 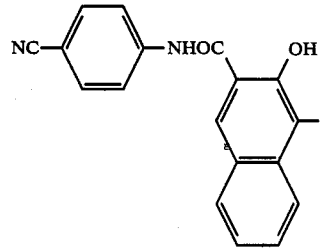 | 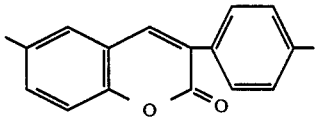 | 3.8 |

TABLE 2-continued
| EX-AMPLE | COUPLING INGREDIENT RESIDUE | 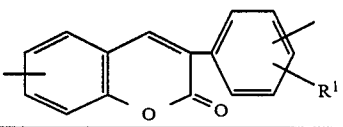 | E½ lux·sec |
|---|---|---|---|
| 48 | 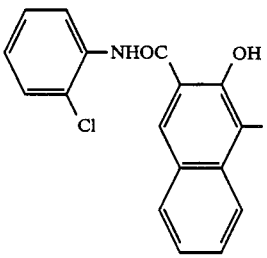 | 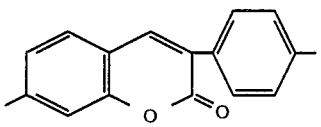 | 3.7 |
| 49 | 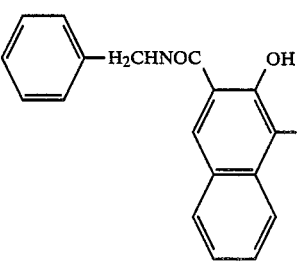 | 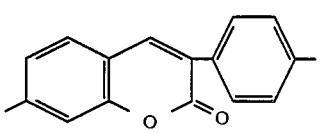 | 4.1 |
| 50 | 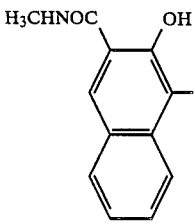 | 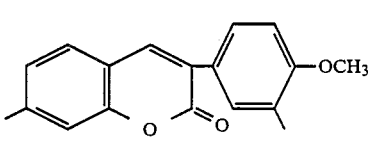 | 4.7 |
| 51 | 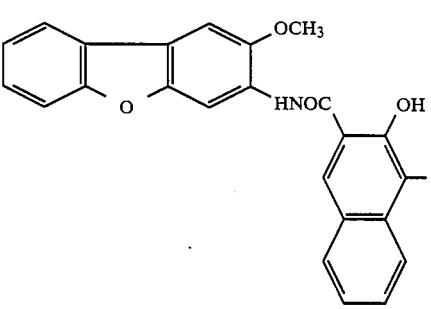 | 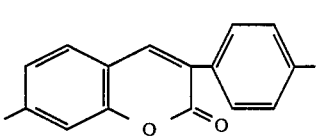 | 6.1 |
| 52 | 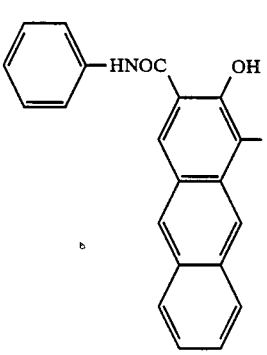 | 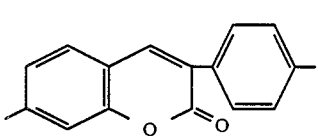 | 5.1 |

TABLE 2-continued
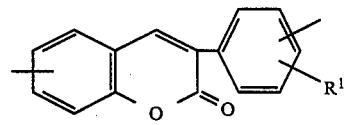
| EXAMPLE | COUPLING INGREDIENT RESIDUE | | $E_{\frac{1}{2}}$ lux·sec |
|---|---|---|---|
| 53 | 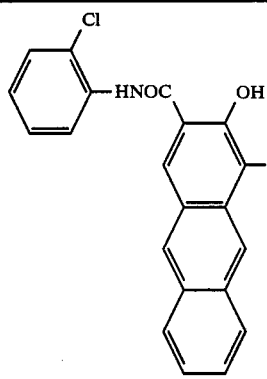 | 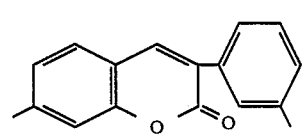 | 4.2 |
| 54 | 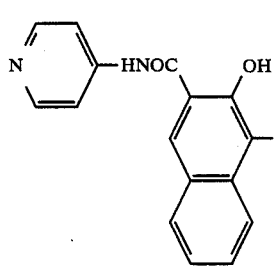 | 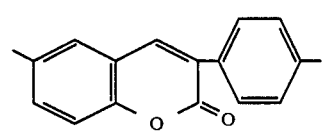 | 6.8 |
| 55 | 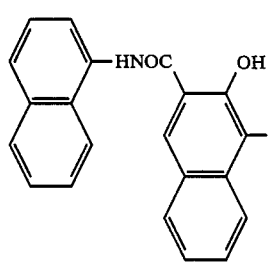 | 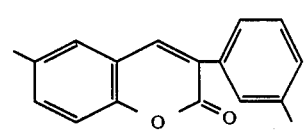 | 5.7 |
| 56 | 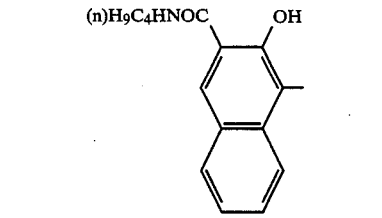 | 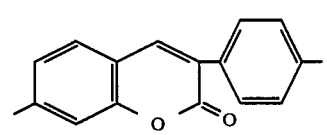 | 4.2 |
| 57 | 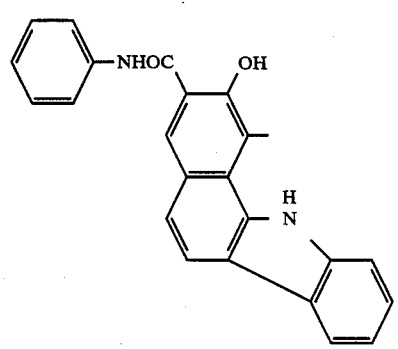 | | 3.7 |

TABLE 2-continued

| EX-AMPLE | COUPLING INGREDIENT RESIDUE | (structure with R¹) | E½ lux·sec |
|---|---|---|---|
| 58 | (structure) | (structure) | 4.3 |
| 59 | (structure) | (structure) | 3.5 |
| 60 | (structure) | (structure) | 4.1 |
| 61 | (structure) | (structure) | 4.7 |

TABLE 2-continued
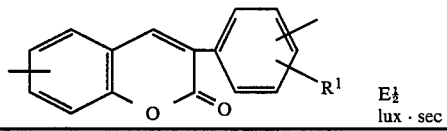
| EX-AMPLE | COUPLING INGREDIENT RESIDUE | | $E_{\frac{1}{2}}$ lux · sec |
|---|---|---|---|
| 62 | 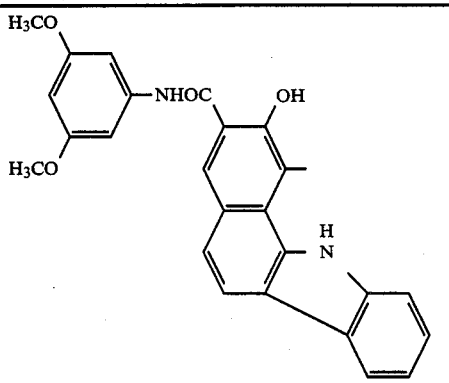 | | 5.1 |
| 63 | 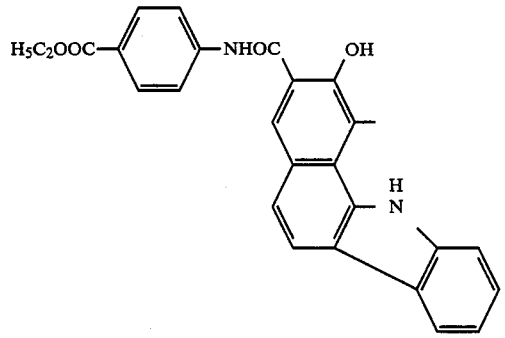 | | 4.2 |
| 64 | 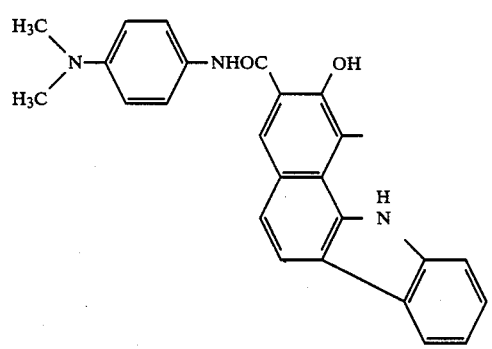 | | 4.7 |
| 65 | 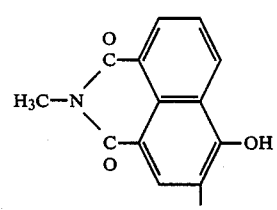 | | 3.6 |
| 66 | 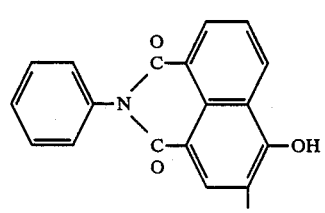 | | 4.1 |

TABLE 2-continued
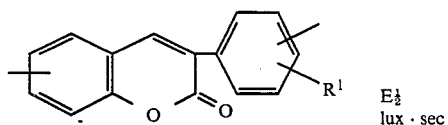
| EX-AMPLE | COUPLING INGREDIENT RESIDUE | | $E_{\frac{1}{2}}$ lux · sec |
|---|---|---|---|
| 67 | 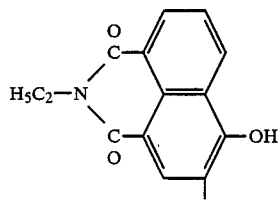 | 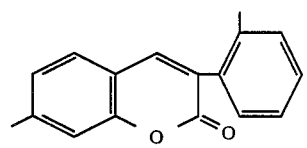 | 4.7 |
| 68 | 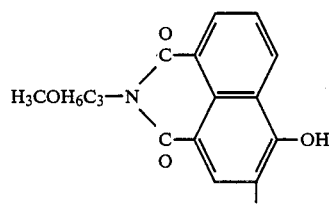 | 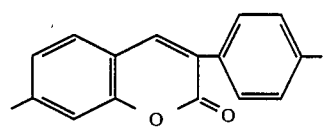 | 4.1 |
| 69 | 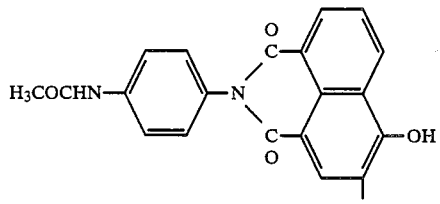 | 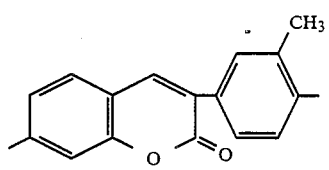 | 5.0 |
| 70 | 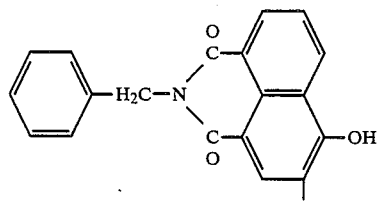 | 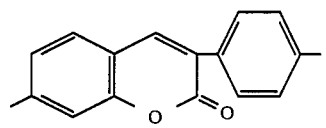 | 5.1 |
| 71 | 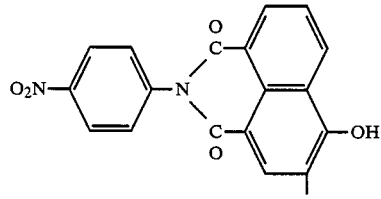 | 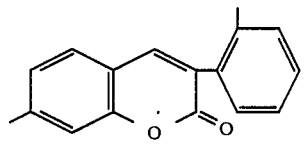 | 4.2 |
| 72 | 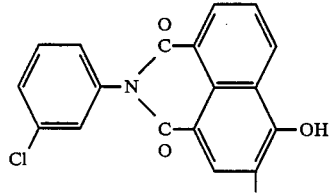 | 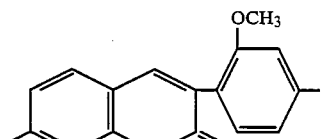 | 4.8 |

TABLE 2-continued
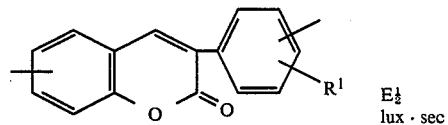
| EX-AMPLE | COUPLING INGREDIENT RESIDUE | | $E_{\frac{1}{2}}$ lux·sec |
|---|---|---|---|
| 73 | 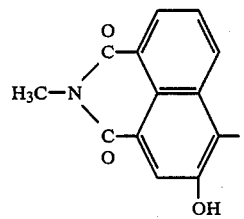 | 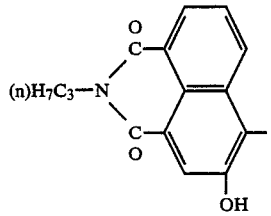 |  |
| Example | Coupling Ingredient Residue | Structure | $E_{\frac{1}{2}}$ lux·sec |
|---|---|---|---|
| 73 | 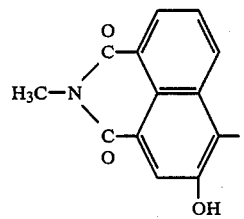 | 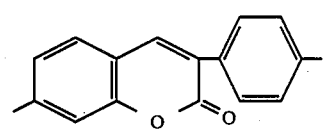 | 4.0 |
| 74 | 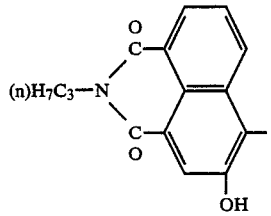 | 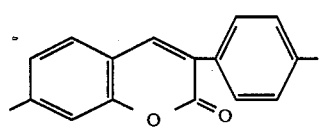 | 4.2 |
| 75 | 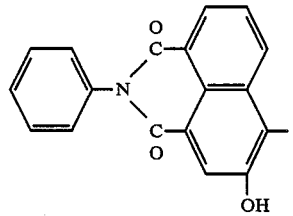 | 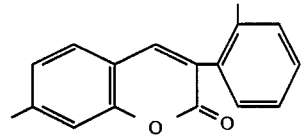 | 4.8 |
| 76 | 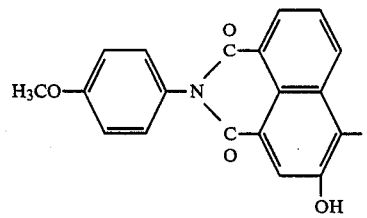 | 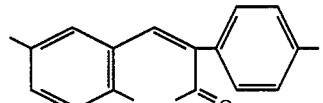 | 4.5 |
| 77 | 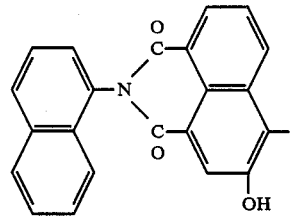 | 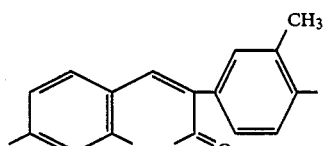 | 5.1 |
| 78 | 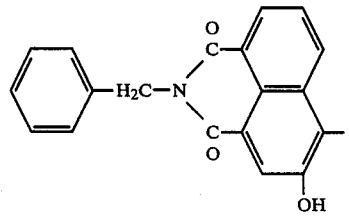 | | 5.8 |

TABLE 2-continued
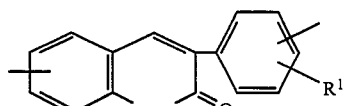
| EX-AMPLE | COUPLING INGREDIENT RESIDUE | | $E_{\frac{1}{2}}$ lux·sec |
|---|---|---|---|
| 79 | 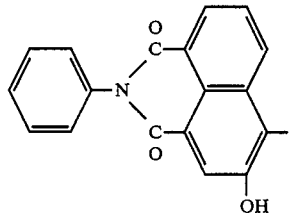 | 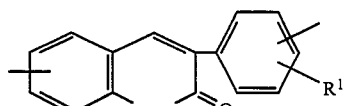 | 4.1 |
| 80 | 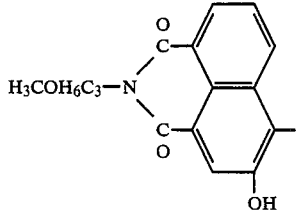 | 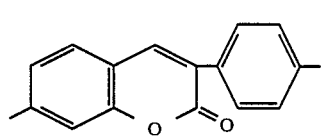 | 4.6 |
| 81 | 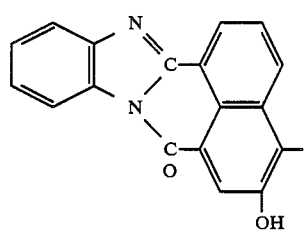 | 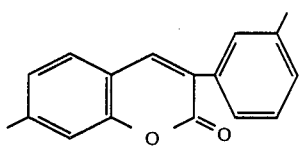 | 1.7 |
| 82 | 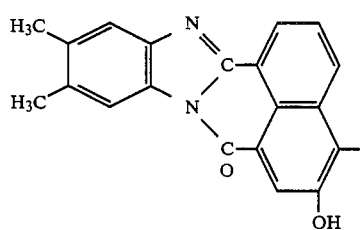 | 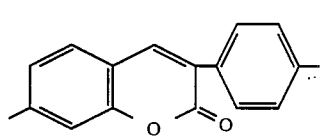 | 1.9 |
| 83 | 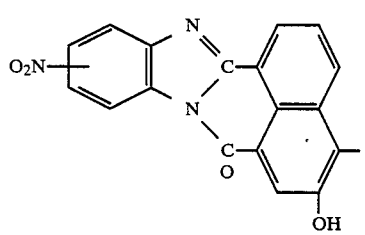 | 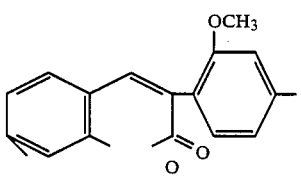 | 3.0 |
| 84 | 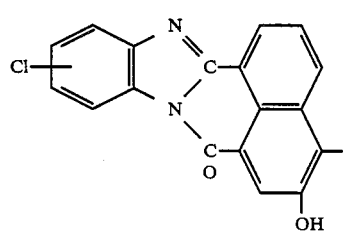 | 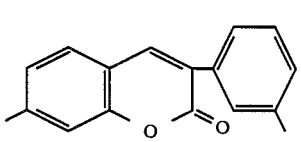 | 2.1 |

TABLE 2-continued
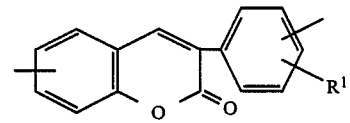
| EX-AMPLE | COUPLING INGREDIENT RESIDUE | | $E_{\frac{1}{2}}$ lux·sec |
|---|---|---|---|
| 85 | 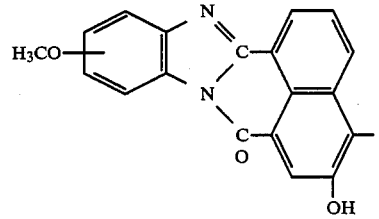 | 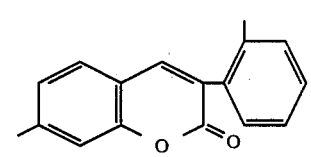 | 2.0 |
| 86 | 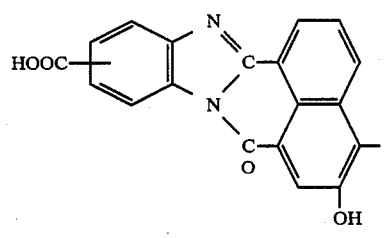 | 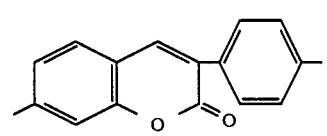 | 8.5 |
| 87 | 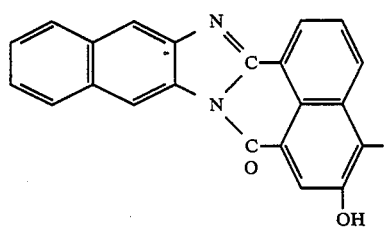 | 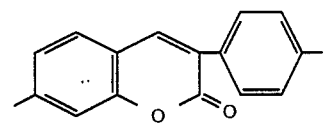 | 6.4 |
| 88 | 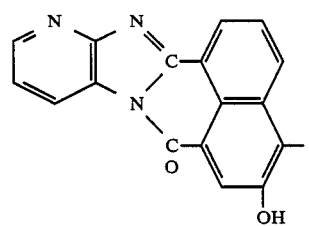 | 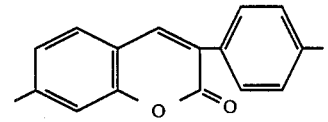 | 18.0 |
| 89 | 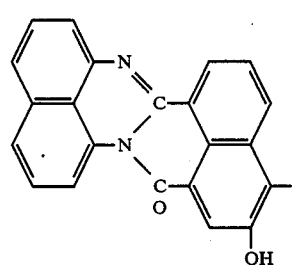 | 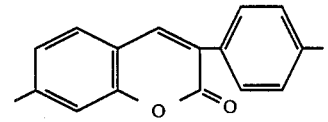 | 6.5 |
| 90 | 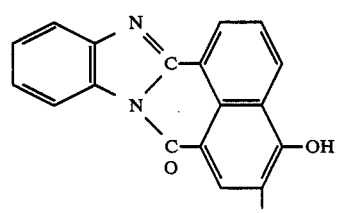 | 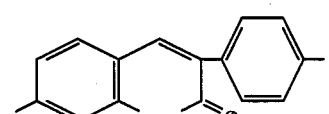 | 1.8 |

TABLE 2-continued

| EX-AMPLE | COUPLING INGREDIENT RESIDUE | 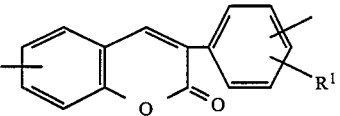 R¹ | $E_{\frac{1}{2}}$ lux·sec |
|---|---|---|---|
| 91 | 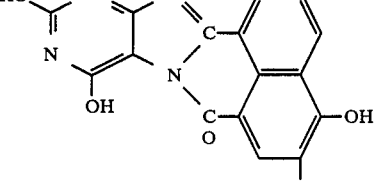 | 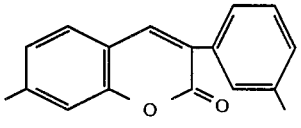 | 1.6 |
| 92 | 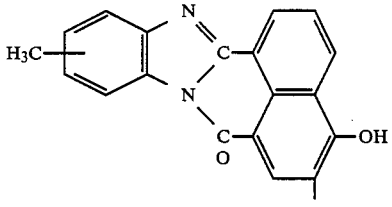 | 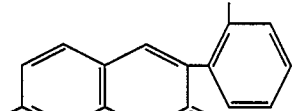 | 2.1 |
| 93 | 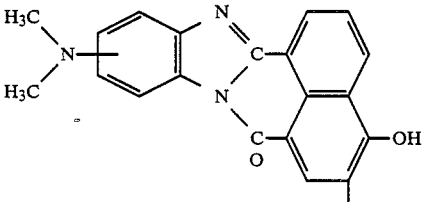 | 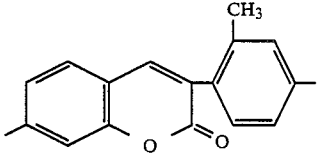 | 8.7 |
| 94 | 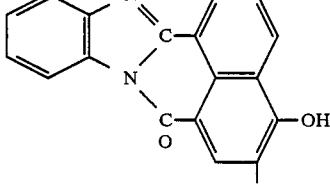 | 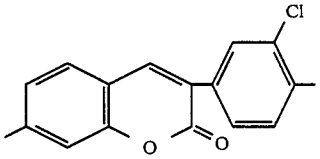 | 1.9 |
| 95 | 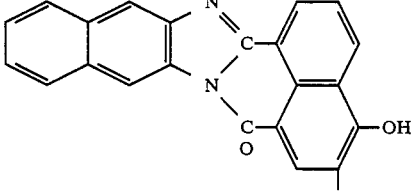 | 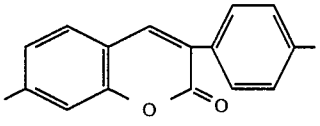 | 4.0 |
| 96 | 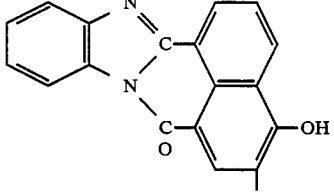 | 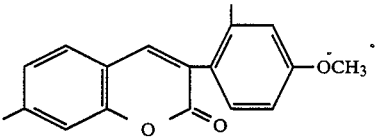 | 1.8 |

EXAMPLES 97 and 98

Using N-methylcarbazole-3-aldehydediphenylhydrazone (EXAMPLE 97) and 1-pyrenealdehydediphenylhydrazone (EXAMPLE 98) instead of N-ethylcarbazole-3-aldehydediphenylhydrazone, the photoreceptors were formed in the same way as in EXAMPLE 1. These photoreceptors are superior in electrical properties such as chargeability, sensitivity and residual potential. Particularly, they showed a high maximum value of spectral sensitivity, which is shown in TABLE 3 with control sensitivities of the conventional photoreceptors for an usual copying machine (Control 1) and for a laser printer (Control 2). The spectral sensitivity was determined as the half-decay exposure energy sensitivity ($\mu J/cm^2$) by irradiating a light at 0.4 $\mu W/cm^2$ separated through a spectrofilter.

TABLE 3

| | Spectral sensitivity $(\mu J/cm^2)^{-1}$ | | |
|---|---|---|---|
| | 60 nm | 650 nm | 700 nm |
| EXAMPLE 97 | 2.7 | 2.8 | 2.1 |
| 98 | 3.9 | 4.1 | 2.8 |
| Control 1 | 2.7 | 1.5 | 0.05 |
| 2 | 1.4 | 1.6 | 1.8 |

What is claimed is:

1. An electrophotographic photoreceptor having on a conductive base a photosensitive layer comprising a medium for transporting a charge carrier and a bis-azo compound represented by the general formula (I):

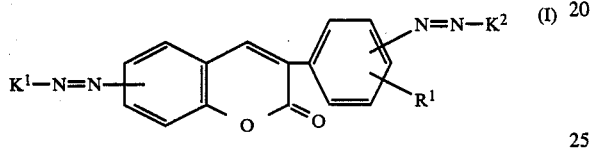

wherein $K^1$ and $K^2$ are independently a coupling ingredient residue with a hydroxy group which has a coupling activity;

$R^1$ is a hydrogen atom, a lower alkyl group, a lower alkoxy group or a halogen atom.

2. An electrophotographic photoreceptor according to claim 1, characterized in that $K^1$ annd $K^2$ are selected from the group consisting of the compounds represented by the general formulae:

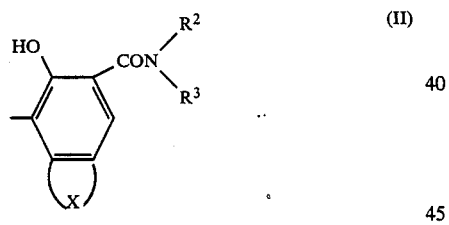

wherein

X is a residue which, upon condensation with a benzene ring, can form a polycyclic aromatic or heterocyclic ring;

$R^2$ and $R^3$ are independently are a hydrogen atom, or an alkyl group, an aralkyl group, an aryl group of a heterocyclic group, which may be substituted, or $R^2$ and $R^3$ may be joined to form an unsubstituted or substituted cyclic amine group with the nitrogen atom to which they are attached;

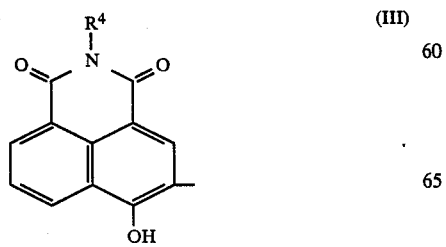

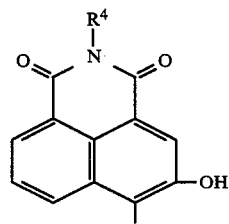

wherein
$R^4$ is the alkyl, aralkyl or aryl group as defined for $R^2$ and $R^3$ above; and

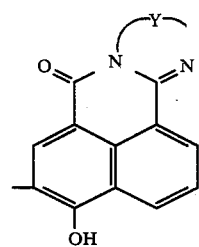

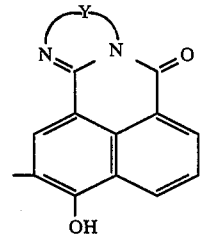

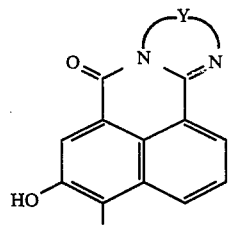

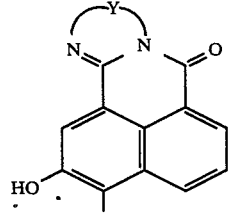

wherein
Y is a divalent aromatic hydrocarbon group or divalent heterocyclic ring group having a nitrogen atom therein, which may be substituted.

3. An electrophotographic photoreceptor according to claim 1, wherein the coupling ingredient residues $K^1$ and $K^2$ are different from each other.

4. An electrophotographic photoreceptor according to claim 2, wherein one of the coupling ingredient residues $K^1$ and $K^2$ is that of the general formula (II) and the other is that of (VI-a) or (VI-b).

5. An electrophotographic photoreceptor according to claim 1, wherein the photosensitive layer comprises the bis-azo compound of the general formula (I) as a material for generating a charge carrier, a medium for transporting the charge carrier and a binder.

6. An electrophotographic photoreceptor according to claim 5, wherein the photosensitive layer is a laminated-typed one in which a transporting layer comprising the medium for transporting the charge carrier is laminated on a generating layer comprising the bis-azo compound of the general formula (I) dispersed or dissolved therein.

7. An electrophotographic photoreceptor according to claim 6, wherein the generating layer comprises the binder in an amount of 0.05 to 5 parts by weight against 1 part by weight of the bis-azo compound of the general formula (I).

8. An electrophotographic photoreceptor according to claim 5, wherein the photosensitive layer is a single layer-typed photosensitive layer in which the bis-azo compound of the general formula (I), the medium for transporting the charge carrier and the binder are contained in a single layer.

9. An electrophotographic photoreceptor according to claim 8, wherein the medium for transporting the charge carrier and the binder are used in amounts of 0.5 to 100 parts and 1 to 100 parts by weight, respectively, against 1 part by weight of the bis-azo compound of the general formula (I).

10. An electrophotographic photoreceptor according to claim 5, wherein the medium for transporting the charge carrier is that for transporting an electron and/or a hole.

11. An electrophotographic photoreceptor according to claim 10, wherein the medium for transporting the hole is one or more compounds selected from the group consisting of a heterocyclic compound, a triarylalkane derivative, a triarylamine derivative, a phenylenediamine derivative, an N-phenylcarbazole derivative, a stilbene derivative and a hydrazone compound.

12. An electrophotographic photoreceptor according to claim 10, wherein the medium for transporting the electron is a nitrated fluorenone or tetracyanodimethane.

13. An electrophotographic photoreceptor according to claim 5, wherein the binder is a homo- or co-polymer of vinyl compounds, a phenoxy resin, polysulfone, polyvinylacetal, polycarbonate, polyester, polyamide, polyurethane, cellulose ester, cellulose ether, an epoxy resin or a silicone resin.

14. An electrophotographic photoreceptor according to claim 1, wherein the photosensitive layer comprises an electron-attracting compound, dye, dispersant, stabilizer, film-formability improving agent, ultraviolet ray absorber, antioxidant, plasticizer and/or cross-linking agent.

* * * * *